US011740158B2

(12) United States Patent
Bier

(10) Patent No.: US 11,740,158 B2
(45) Date of Patent: Aug. 29, 2023

(54) METHOD FOR OPERATING A TEST BENCH IN ORDER TO DETERMINE A TORQUE AND A SPEED

(71) Applicant: AVL LIST GMBH, Graz (AT)

(72) Inventor: Maximilian Bier, Darmstadt (DE)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 17/633,401

(22) PCT Filed: Aug. 12, 2020

(86) PCT No.: PCT/AT2020/060298
§ 371 (c)(1),
(2) Date: Feb. 7, 2022

(87) PCT Pub. No.: WO2021/026578
PCT Pub. Date: Feb. 18, 2021

(65) Prior Publication Data
US 2022/0326116 A1    Oct. 13, 2022

(30) Foreign Application Priority Data
Aug. 12, 2019 (AT) ................. A 50711/2019

(51) Int. Cl.
*G01M 13/025* (2019.01)
(52) U.S. Cl.
CPC ................. *G01M 13/025* (2013.01)
(58) Field of Classification Search
CPC .................................................. G01M 13/025
See application file for complete search history.

(56) References Cited

U.S. PATENT DOCUMENTS

| 7,770,440 | B2 * | 8/2010 | Langthaler | G01M 13/025 |
| | | | | 73/114.25 |
| 11,441,971 | B2 * | 9/2022 | Akiyama | G01P 3/00 |
| 2008/0190183 | A1 * | 8/2008 | Erlach | G01M 15/044 |
| | | | | 73/862.08 |

(Continued)

FOREIGN PATENT DOCUMENTS

DE  102014204154 A1  9/2015
EP      0280948 A1  9/1988

(Continued)

*Primary Examiner* — Eric S. McCall
(74) *Attorney, Agent, or Firm* — Dykema Gossett PLLC

(57) ABSTRACT

Various embodiments of the present disclosure are directed to methods for operating a test bench with a test object having at least two rotating masses connected by means of a loading shaft to a loading maching for driving or loading the test object. The loading maching controlled by a loading machine control unit. In one embodiment, the method includes: applying loads to the test object on the test bench, estimating an internal test object torque, determining a target loading machine speed, determining a shaft torque acting on the loading shaft, determining acceleration torques for accelerating the at least two rotating masses, addind the shaft torque with the correct sign with the correct sign to the acceleration torques, to form a corrected internal effective test object torque, and determining the target loading machine speed from the corrected internal effective test object torque or a torque derived therefrom.

24 Claims, 8 Drawing Sheets

(56) References Cited

U.S. PATENT DOCUMENTS

| | | | |
|---|---|---|---|
| 2019/0310162 A1* | 10/2019 | Pfeiffer | G01M 17/0072 |
| 2021/0088410 A1* | 3/2021 | Bier | F02D 35/023 |
| 2021/0096040 A1* | 4/2021 | Bier | G01M 15/08 |
| 2021/0190633 A1* | 6/2021 | Signor | G01M 13/025 |
| 2022/0065749 A1* | 3/2022 | Kural | G01M 17/00 |
| 2022/0291085 A1* | 9/2022 | Bier | G01M 15/046 |

FOREIGN PATENT DOCUMENTS

| | | |
|---|---|---|
| EP | 2161560 A2 | 3/2010 |
| EP | 2018185286 A1 | 10/2018 |
| WO | 2014195238 A1 | 12/2014 |

\* cited by examiner

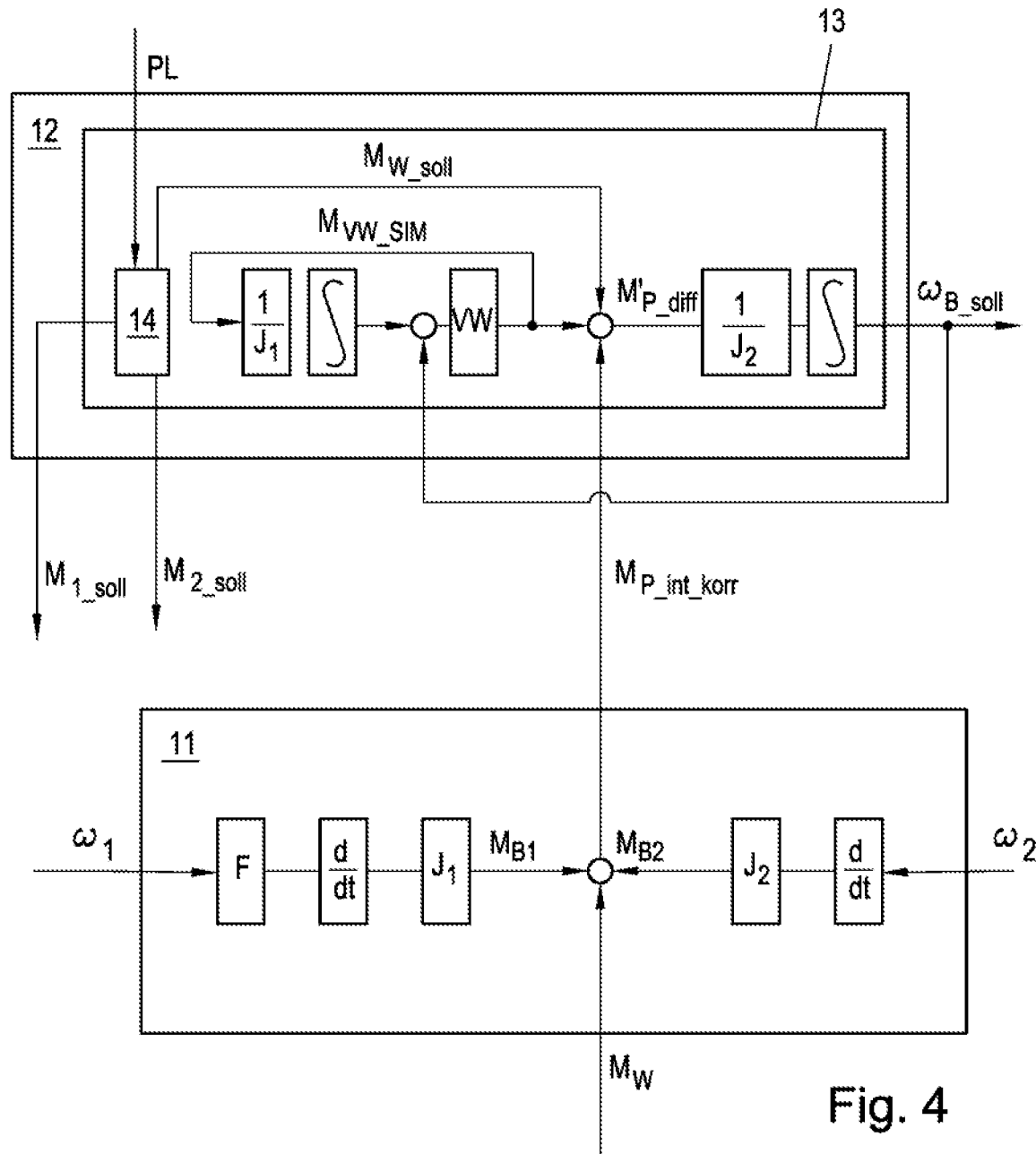
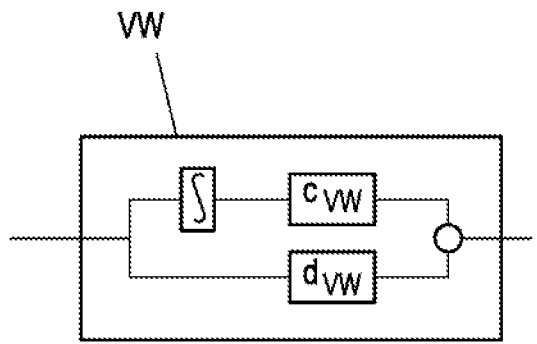
Fig. 4
Fig. 4a

METHOD FOR OPERATING A TEST BENCH IN ORDER TO DETERMINE A TORQUE AND A SPEED

CROSS-REFERENCE TO RELATED APPLICATIONS

This application is a national stage filing based upon International PCT Application No. PCT/AT2020/060298, filed 12 Aug. 2020, which claims the benefit of priority to Austria application No. A 50711/2019, filed 12 Aug. 2019.

BACKGROUND

The present invention relates to a method for operating a test bench with a test object having at least two rotating masses which are connected in a rotationally fixed manner and each have a mass moment of inertia, with at least one rotating mass being connected by means of a loading shaft to a loading machine for driving or loading the test object, the loading machine being controlled by a loading machine control unit, and with loads being applied to the test object on the test bench and an internal test object torque being estimated and used to determine a target loading machine speed that is adjusted by the loading machine control unit. The invention further relates to a test bench with a test object and with at least one loading machine for driving and/or loading the test object, the test bench being configured to simulate loads acting on the test object, the test object having at least two rotating masses which each have a mass moment of inertia and are connected in a rotationally fixed manner by means of a connecting element, with at least one rotating mass being connected to a loading machine via a loading shaft, with an observer being provided for estimating an internal test object torque, with a test bench computing unit being provided for determining a target loading machine speed, and the test bench having at least one loading machine control unit for controlling the at least one loading machine, which is provided for adjusting the target loading machine speed.

For many years, test benches have been used in the development of drive units, such as internal combustion engines, electric motors or a combination of internal combustion engine and electric motor (so-called hybrid drives), and the basic structure and mode of operation of these test benches are well known. It has always been a substantial requirement of such test benches to ensure the most accurate and reproducible simulation of given speed/torque profiles on the output shaft of the drive unit. For this purpose, the drive unit is connected to a loading machine (dynamometer, dyno) via a loading shaft.

As a rule, the speed is set on the test bench via the loading machine and the torque is set via the drive unit. Due to the limited availability of drive and measurement technology or control and regulation devices, it was initially possible to set and measure primarily stationary operating points (speed/torque combination). For many test runs, it was also sufficient to only go to stationary operating points. Due to increasing requirements for drive units (e.g. high engine performance, low consumption, low pollutant emissions in internal combustion engines) and progressive development in the technical fields mentioned, but also due to increasing requirements and specifications for testing drive units, it has become possible and necessary on the test benches to set not only stationary operating points on the test benches, but also dynamic speed/torque curves. "Dynamic" here in particular means not only stationary operating points (i.e. a substantially steady state) but also, above all, rapid changes in speed and/or torque. These profiles can be e.g. legally prescribed measurement cycles for the exhaust gas certification of internal combustion engines in order to provide evidence of compliance with limit values for pollutant emissions. However, in order to optimize the performance and consumption of drive units, highly dynamic and non-standardized driving profiles measured with a vehicle in the course of a test drive on the road or on a test track are also being used more and more often in real terms, e.g. when the drive unit is used as a vehicle drive. These dynamic profiles place very high demands on the control of test benches, which cannot always be adequately met.

In the past, drive units were usually tested on the test bench that had only one rotating mass, such as an internal combustion engine or an electric motor, or whose rotating mass can be regarded as only one rotating mass from the control point of view. The control of the test bench with a drive unit with a rotating mass is known in the prior art and can be easily mastered.

In particular, due to the increasingly stringent exhaust emission legislation around the world, the focus of drive development has recently been strongly directed toward hybrid units, i.e. a combination of multiple drive units each having a separate rotating mass, predominantly an internal combustion engine combined with an electric motor. Such hybrid units are available in various known configurations, for example as so-called parallel or serial hybrid drives. A serial hybrid is e.g. a hybrid drive with a so-called range extender. In this case only the electric motor is provided for direct drive of the vehicle, with the power from the electric motor usually being transmitted to the wheels of the vehicle via a transmission, e.g. in the case of a road vehicle, in order to drive the vehicle. The internal combustion engine provided as a range extender is not directly coupled to the drive train in this arrangement and then substantially serves to supply energy via a generator to an electrical energy store, which in turn supplies energy to the electric motor. The range extender thus extends the electric range of the electric drive. The testing of such a serial hybrid does not substantially differ from the conventional arrangement since, on the test bench, only the electric motor is connected to the loading machine via the loading shaft.

In a parallel hybrid drive, the electric motor and the combustion engine each transmit power directly to the drive train. In the case of parallel vehicle hybrid drives, a distinction is made according to the installation location of the electric motor. In the so-called P1 unit, the electric motor is directly connected to the output of the combustion engine. P1 units are generally only used in connection with relatively low electrical power, e.g. as a so-called starter generator, and purely electrical operation is not possible. In the case of P2 units, a connecting shaft with a clutch is provided between the internal combustion engine and the electric motor, and the electric motor is usually connected to the transmission. In this arrangement, the internal combustion engine can be decoupled from the electric motor, which means that purely electric operation is also possible. There are also so-called P3 and P4 units, with the P3 unit only having the electric motor at the transmission output. In the P4 arrangement, the combustion engine and the electric motor each act on their own drive axle. P1, P3 and P4 units can be controlled relatively easily on the engine or unit test bench. With the P1 unit, the two directly connected rotating masses of the internal combustion engine and the electric motor can be effectively approximated by a single overall rotating mass. In the case of the P3 and P4 arrangements, the arrangement substantially corresponds to the conventional test bench structure of a power pack or drive train test bench. In this case, too, the control of the test bench can be easily mastered in the prior art.

Methods for controlling the torque of the loading shaft on the test bench by means of a test object observer are also known, for example. The torque on the loading shaft can be adjusted in a highly dynamic manner without using a dedicated controller for the torque on the loading shaft. Only a speed controller is used to control the speed of the loading shaft. A so-called speed-controlled simulation connection with feedback of an internal effective test object torque is also known. In the case of P2 units, however, stability problems arise due to the rotating masses of the internal combustion engine and the electric motor that are coupled by means of a clutch, in particular when the clutch is opened or closed and the internal combustion engine is decoupled from or coupled to the electric motor. The stability problems of the control result from the oscillation behavior of the clutch, which is a torsionally flexible connection whose oscillation behavior in the closed state is comparable to the oscillation behavior of a dual-mass flywheel. There is currently no satisfactory solution to this problem in the prior art.

A drive train on a test bench may however include other rotating masses, such as a dual-mass flywheel, besides torque generators and/or in addition to torque generators. Such rotating masses can also lead to stability problems in the control system for carrying out a test run.

Accordingly, the problem addressed by the invention is that of providing an easy-to-use method which is improved over the prior art for operating a test object having multiple rotating masses on a test bench, as well as a corresponding test bench, by means of which dynamic test runs can be carried out with stable control.

SUMMARY OF THE INVENTION

The problem is solved according to the invention in that a shaft torque acting in the loading shaft is determined for the at least one loading shaft and is added to determined acceleration torques for accelerating the at least two rotating masses, with the correct sign, to form a corrected internal effective test object torque, and in that the target loading machine speed is determined from the corrected internal effective test object torque or at least a torque derived therefrom, a specified target test object torque and from the mass moments of inertia or simulated mass moments of inertia of the at least two rotating masses. The method according to the invention can improve the stability of the control of a test object having multiple rotating masses on the test bench.

The shaft torque acting in at least one loading shaft is preferably measured by means of a torque measuring device on the loading shaft. As a result, the shaft torque can be recorded using standard measurement technology. Alternatively, the shaft torque could also be estimated from other recorded measurement variables, such as speeds or torques, for example by means of a well-known observer or a mathematical model.

The acceleration torque of at least one rotating mass is advantageously determined from a speed of the relevant rotating mass and from the mass moment of inertia of the relevant rotating mass, the speed of the at least one rotating mass preferably being measured by means of a speed measuring device on the test bench. As a result, actual values of the speeds can be determined with the highest possible resolution and with a minimal time delay and can be used to calculate the acceleration torque.

The measured speed, an angular acceleration calculated therefrom or at least one acceleration torque is preferably filtered by means of a filter. In this way, for example high-frequency vibrations can be filtered out of the speed signal, as a result of which an averaged speed signal is obtained. This is particularly advantageous when using an internal combustion engine in order to filter combustion shocks.

A torque generator which is controlled by means of a test object control unit is preferably provided as at least one rotating mass, and, as the torque generator, an internal combustion engine which is controlled by an internal combustion engine control unit is preferably used, or an electric motor controlled by an electric motor control unit is provided. As a result, the method can be used for example for a hybrid drive unit in which an electric motor and an internal combustion engine interact.

A dual-mass flywheel can also be used for two rotating masses of the test object connected in a rotationally fixed manner and/or the two rotating masses are connected to a connecting shaft, a belt or a chain in a rotationally fixed manner, and so the possible uses of the method can be expanded.

The target loading machine speed can be determined by adding the corrected internal effective test object torque and the specified target shaft torque, with the correct sign, to form a first differential torque and by multiplying the first differential torque by the reciprocal of a sum of the mass moments of inertia or simulated mass moments of inertia of the at least two rotating masses and integrating it over time.

In order to represent the oscillation behavior in the simulated drive train as realistically as possible in terms of a vehicle, the target loading machine speed is preferably determined by adding the corrected internal effective test object torque, the specified target shaft torque and at least one simulated connecting element torque of a virtual connecting element that represents the rotationally fixed connection of the at least two rotating masses, with the correct sign, to form a second differential torque and by multiplying the second differential torque by the reciprocal of the mass moment of inertia or a simulated mass moment of inertia of the rotating mass connected to the loading shaft and integrating it over time, the at least one simulated connecting element torque being determined from the mass moment of inertia or a simulated mass moment of inertia of the at least one remaining rotating mass, from the fed-back target loading machine speed and mechanical properties of the virtual connecting element.

A further improvement of the method is achieved when the target loading machine speed is determined by adding the specified target shaft torque, at least one simulated connecting element torque of a virtual connecting element that represents the rotationally fixed connection of the at least two rotating masses and an estimated internal torque of the rotating mass connected to the loading shaft, with the correct sign, to form a third differential torque and by multiplying the third differential torque by the reciprocal of the mass moment of inertia or a simulated mass moment of inertia of the rotating mass connected to the loading shaft and integrating it over time, the at least one simulated connecting element torque being determined from the mass moment of inertia or a simulated mass moment of inertia of the at least one further rotating mass, from the fed-back target loading machine speed, from mechanical properties of the at least one virtual connecting element and from an estimated internal torque of the at least one further rotating mass which is formed from a sum, with the correct sign, of the corrected internal effective test object torque and an estimated internal torque of the rotating mass connected to the loading shaft. By using a virtual connecting shaft, the method can be better adapted to the real test object, for example as part of a vehicle.

In order to further improve the method, it is advantageous to determine the target loading machine speed by adding the specified target shaft torque, at least one simulated connecting element torque of a virtual connecting element that represents the rotationally fixed connection of the at least two rotating masses and an oscillating estimated internal torque of the rotating mass connected to the loading shaft, with the correct sign, to form a fourth differential torque and by multiplying the fourth differential torque by the reciprocal of the mass moment of inertia or a simulated mass moment of inertia of the rotating mass connected to the loading shaft and integrating it over time, the at least one simulated connecting element torque being determined from the mass moment of inertia or a simulated mass moment of inertia of the at least one further rotating mass, from the fed-back target loading machine speed, from mechanical properties of the at least one virtual connecting element and from an estimated average internal torque of the at least one further rotating mass which is formed by a filtered sum, with the correct sign, of the corrected internal effective test object torque and the estimated internal torque of the rotating mass connected to the loading shaft, the oscillating estimated internal torque of the rotating mass connected to the loading shaft being formed from a sum, with the correct sign, of the corrected internal effective test object torque and the estimated average internal torque of the at least one remaining rotating mass. This means that vehicle-realistic oscillation behavior of the test object can be simulated even better on the test bench and in a possibly connected drive train and vehicle simulation.

The simulated connecting element torque is preferably determined by multiplying the fed-back simulated connecting element torque or a sum, with the correct sign, of the fed-back simulated connecting element torque and the estimated internal torque or the estimated average internal torque of the at least one remaining rotating mass by the reciprocal of the mass moment of inertia or a simulated mass moment of inertia of the at least one remaining rotating mass, integrating it over time, adding it, with the correct sign, to the fed-back target loading machine speed and multiplying it by the mechanical properties of the at least one virtual connecting element.

For the simplest possible simulation of the real connecting element, a spring stiffness and a damping coefficient are preferably used as mechanical properties of the virtual connecting element.

The problem is also solved according to the invention with a test bench mentioned at the outset in that the observer is designed to add a shaft torque determined on the test bench and acting in the at least one loading shaft to determined acceleration torques for accelerating the at least two rotating masses, with the correct sign, to form a corrected internal effective test object torque and in that the test bench computing unit is designed to determine the target loading machine speed from the corrected internal effective test object torque or a torque derived therefrom, a specified target shaft torque and from the mass moments of inertia or simulated mass moments of inertia of the at least two rotating masses.

The observer is advantageously designed to determine the acceleration torque of at least one rotating mass from a speed of the relevant rotating mass and from the mass moment of inertia of the relevant rotating mass.

In a variant, at least one speed measuring device for measuring the speed of at least one rotating mass is provided on the test bench.

In a further variant, at least one filter is provided on the test bench for filtering the measured speed of an angular acceleration calculated therefrom or at least one acceleration torque.

Preferably, at least one rotating mass of the test object is a torque generator and a test object control unit for controlling the at least one torque generator is provided on the test bench.

Optionally an internal combustion engine is provided as the torque generator, the test object control unit having an internal combustion engine control unit for controlling the internal combustion engine, or an electric motor is provided as the torque generator, the test object control unit having an electric motor control unit for controlling the electric motor.

In a variant, a dual-mass flywheel is provided for two rotating masses of the test object connected in a rotationally fixed manner. Optionally, a connecting shaft, a belt or a chain is provided as a connecting element for the rotationally fixed connection of two rotating masses. In a variant, at least one clutch is provided on the test bench at least between two rotating masses for decoupling the at least two rotating masses.

The test bench computing unit is expediently configured to simulate the rotationally fixed connection of two rotating masses, in particular the connecting element, by means of a virtual connecting element.

BRIEF DESCRIPTION OF THE DRAWINGS

In the following, the present invention is described in greater detail with reference to FIGS. 1 to 8, which, by way of example, show schematic and non-limiting advantageous embodiments of the invention, and in which:

FIG. 4 and FIG. 4a show the function of an observer and a test bench computing unit of a second embodiment.

DETAILED DESCRIPTION

Figure 1:
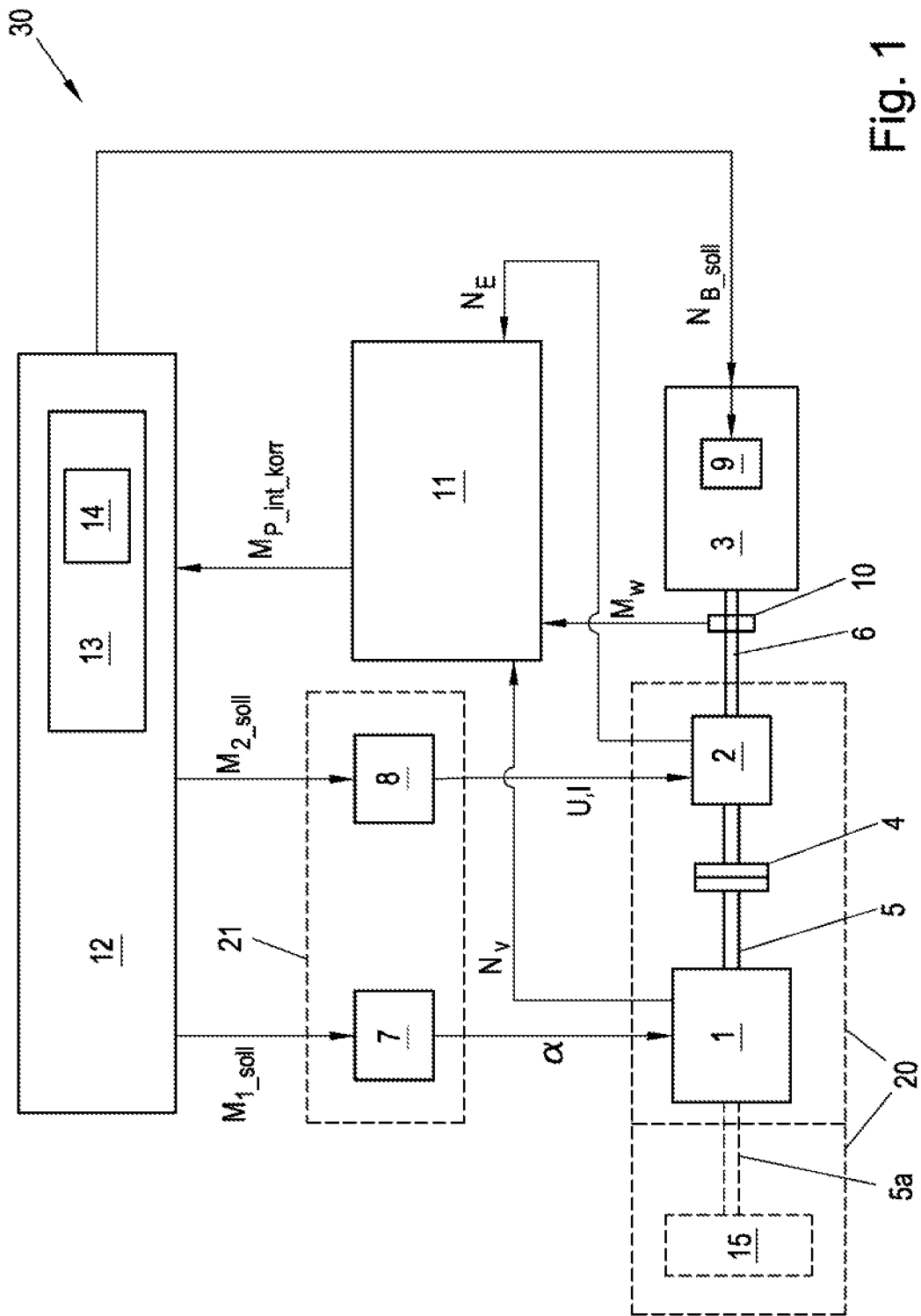
FIG. 1 shows a structure of a test bench with a test object.

FIG. 1 schematically shows a basically known structure of a test bench 30 with a test object 20. The test object 20 has two rotating masses 1, 2 which are connected in a rotationally fixed manner by means of a connecting element 5, in this case in the form of a connecting shaft. The invention is described below in a non-limiting manner using a P2 unit as test object 20. A torque generator, in particular an internal combustion engine, is provided here as the first rotating mass 1, and a torque generator is also provided as the second rotating mass 2, in this case an electric motor. According to the invention, at least one of the (in this case two) rotating masses 1, 2 is connected by means of a loading shaft 6 to a loading machine 3 for driving or loading the test object 20. In the example shown, this is the second rotating mass 2 or the electric motor.

Figure 7:
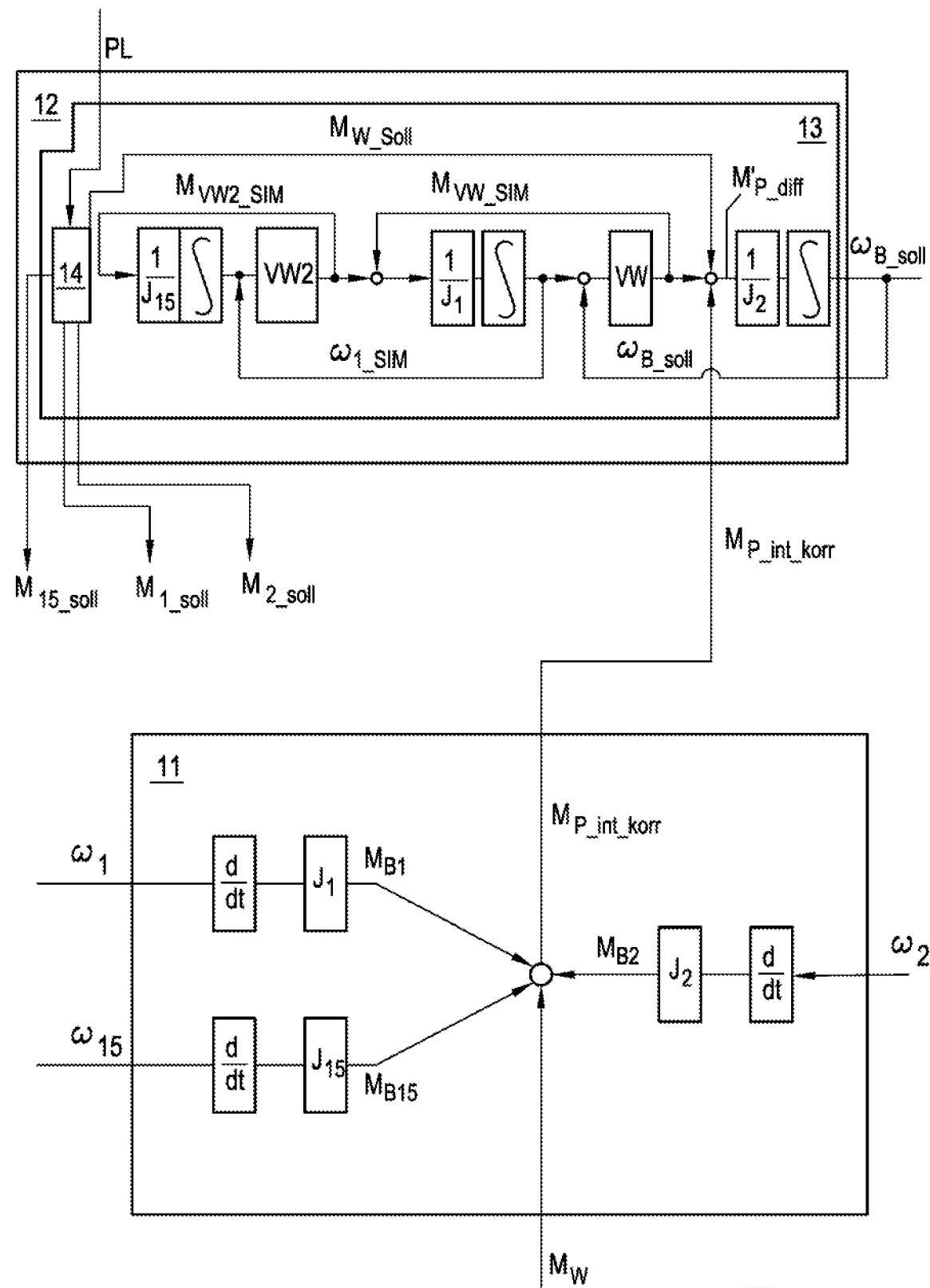
FIG. 7 shows the function of an observer and a test bench computing unit of the second embodiment when using a test object having three rotating masses
Figure 8:
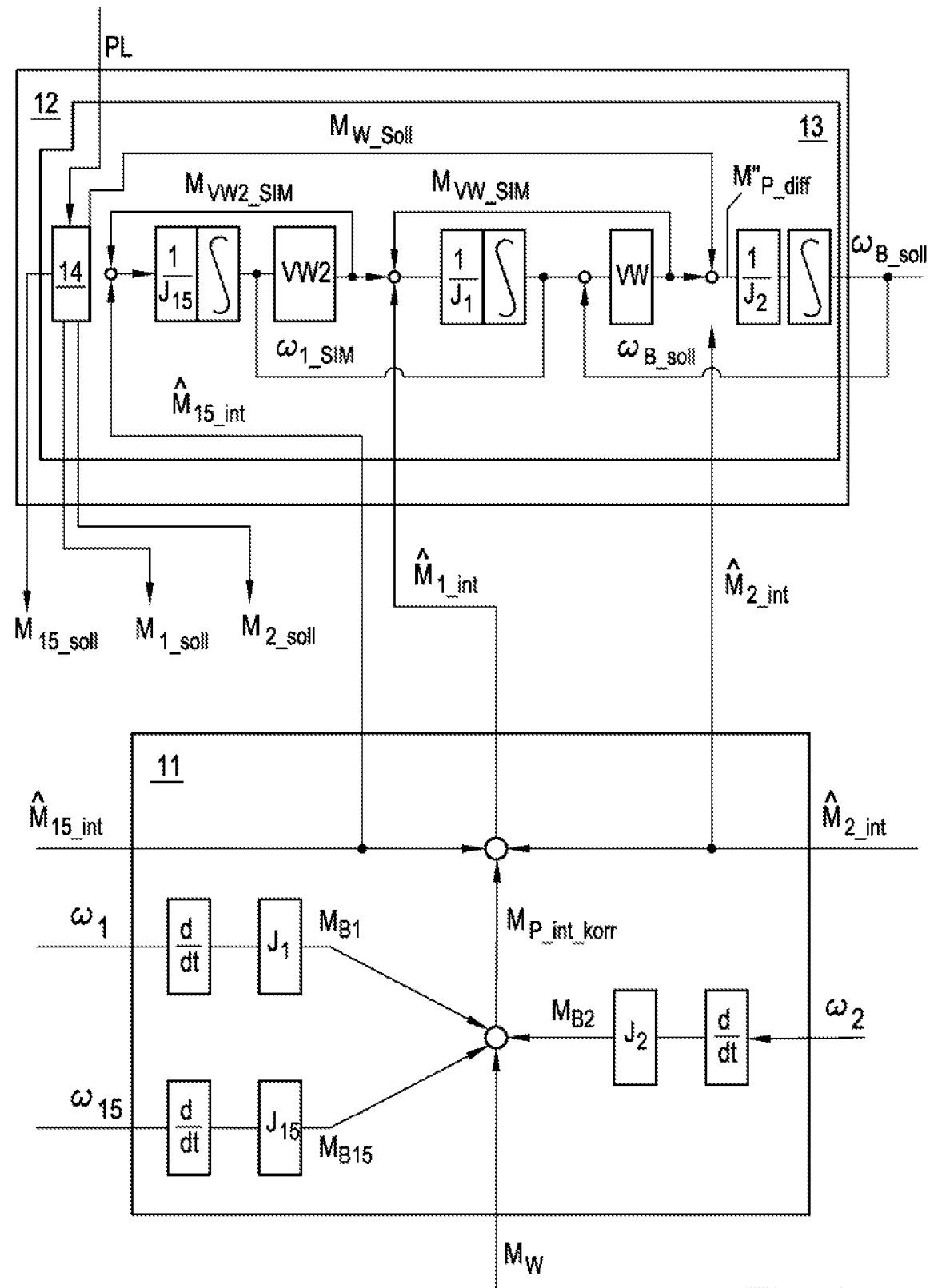
FIG. 8 shows the function of an observer and a test bench computing unit of the third embodiment when using a test object having three rotating masses.

Instead of a P2 unit, other configurations of the test object 20 in which the test object 20 has at least two rotating masses are of course also possible. For example, more than two rotating masses 1, 2 could of course also be used, each of which is connected in a rotationally fixed manner via a connecting element 5. The rotating masses 1, 2 also do not necessarily have to be torque generators, as in the embodiment, but a rotating mass, 1, 2 could also be a passive rotating mass, for example a dual-mass flywheel or a transmission. For example, the first rotating mass 1 could also be connected to a third rotating mass 15 by a second connecting element 5a, as indicated in FIG. 1 by dashed lines. However, this does not change anything for the method according to the invention. For the sake of simplicity, the invention is therefore described in the following mainly on the basis of a test object 20 having two rotating masses 1, 2 connected in a rotationally fixed manner. For the sake of completeness, however, an embodiment having three rotating masses is also shown in FIG. 7 and FIG. 8.

The connecting element 5 is used to transmit torque between the rotating masses 1, 2, in this case between the internal combustion engine and the electric motor, and is designed here as a connecting shaft. Of course, other designs of the connecting element 5 that are suitable for torque transmission would also be conceivable, such as a belt, a chain, etc. The electric motor (rotating mass 2) is in turn connected to the loading machine 3 via the loading shaft 6. A clutch 4 is provided on the connecting shaft 5 in this case between the first rotating mass 1 (internal combustion engine) and the second rotating mass 2 (electric motor), by means of which clutch the internal combustion engine can be decoupled from and coupled to the electric motor. The clutch 4 is, however, only optional and not necessary for the instant method.

The test bench 30 comprises a test bench computing unit 12 or is connected to such a unit. Depending on the design of the test bench 30, the test bench computing unit 12 has at least one or more of the following components in a common or different hardware unit: Automation unit, control system for test bench and/or individual components of the test bench, test object control unit (e.g. for internal combustion engine control unit, electric motor control unit), simulation system, engine control unit for internal combustion engine or electric or hybrid motor.

Variants are also possible in which, for example, the control system is designed as part of the machine control system for the loading machine 3 so that speed control and if necessary other functions are carried out in the converter of the loading machine 3. While an automation system generally automates the processes on the test bench (e.g. test runs), integrates measuring devices, acquires measurement data or synchronizes measurements, a control unit can also be integrated into an automation unit in variants.

The simulation system can also be implemented independently in the test bench computing unit 12, or in a manner integrated into a control or automation system.

The configuration used is described in each of the embodiments described below.

In the present case, for controlling the test bench 30, a test bench computing unit 12 for specifying target values for the control and a loading machine control unit 9 for controlling the loading machine 3 are provided. The test bench computing unit 12 does not necessarily have to be part of the test bench 30, but could also be an external or additional computing unit with corresponding software. While the loading machine control unit 9 is described as a separate component in the present embodiment, in other configurations it can also be part of or supplemented by the test bench computing unit 12, which, in turn, can also have a test bench automation unit. If the test object 20 has one or more torque generators, as in the example shown, a test object control unit 21 is also provided on the test bench 30 to control the torque generator(s). In the example shown, the test object control unit 21 has, for example, an internal combustion engine control unit 7 for controlling the internal combustion engine and an electric motor control unit 8 for controlling the electric motor 2. If, as indicated by dashed lines, a further torque generator were provided as a third rotating mass 15, a further control unit (not shown) can be provided. Of course, it would be possible to provide only a single common test object control unit 21 for a plurality of torque generators, or the test object control units 21 could be supplemented by test-bench-related control units. The individual control units could be integrated in the relevant torque generator or, as shown, be designed as separate units or they could also be integrated in the test bench computing unit 12. The loading machine control unit 9 is integrated in the loading machine 3 in the example shown, but could also be provided outside of the loading machine 3 as a separate unit or could also be integrated in the test bench computing unit 12 or its test bench automation unit. The test object control unit 21, or the internal combustion engine control unit 7 and the electric motor control unit 8, as well as the loading machine control unit 9 can be implemented in the form of suitable hardware and/or software.

A further loading machine could also be connected to one of the further rotating masses. This loading machine could then replace a torque generator on the test bench 30, for example. For the control of this further loading machine, a loading machine control unit can then in turn be provided, for which the same applies as for the loading machine control unit 9.

The first rotating mass 1 (internal combustion engine) and the second rotating mass 2 (electric motor) can each have a suitable speed measuring device (not shown) for measuring the speeds $N_i$ (or angular speeds $\omega_i$) of the relevant rotating mass 1, 2, and the loading machine 3 can also have a speed measuring device for measuring the loading machine speed $N_B$ (or loading machine angular speed $\omega_B$). A suitable torque measuring device 10 for measuring the shaft torque $M_W$ can be arranged on the loading shaft 6. Instead of using a torque measuring device 10, the shaft torque $M_W$ acting in the loading shaft 6 could for example also be estimated from a torque determined on the loading machine 3 and the loading machine speed $N_B$ or from the speeds $N_i$ of the rotating mass 2, the loading machine speed $N_B$ and the properties of the loading shaft 6. Electric machines, such as direct current machines, asynchronous machines or three-phase synchronous machines, which are connected to the loading shaft 6, are usually used as the loading machine 3.

Target values for the control are transmitted from the test bench computing unit 12 or its test bench automation unit to the individual control units 21 (7, 8), 9, in which manipulated values are calculated by means of suitable controllers. For example, a target torque $M_{1\_soll}$ can be specified for the internal combustion engine, from which the test object control unit 21 (in this case the internal combustion engine control unit 7) calculates a manipulated variable, for example an accelerator pedal position a. Similarly, a target torque $M_{2\_soll}$ can be specified for the electric motor, from which the test object control unit 21 (in this case the electric motor control unit 8) calculates a suitable manipulated variable, such as a current I and/or a voltage U. Furthermore, a target loading machine speed $N_{B\_soll}$ is calculated in the test bench computing unit 12, from which the loading machine control unit 9 also calculates a corresponding manipulated variable, for example a current or a voltage. The target torque $M_{1\_soll}$ of the internal combustion engine (rotating mass 1) and the target torque $M_{2\_soll}$ of the electric motor (rotating mass 2) are usually prespecified by a desired test run PL which is to be carried out by the test object 20. For other torque generators, other target values can of course also be specified and other control values can also be calculated.

The manipulated variables are then set on the test bench 30 by means of corresponding actuators. For an internal combustion engine, for example, an engine control unit can be provided that determines suitable controlled variables for the internal combustion engine from the accelerator pedal position a and a current operating state, for example an injection quantity, an injection time, etc. Such a test run PL can, in a known manner, be a specific measured speed/torque curve of a previously performed driving test, can originate from other sources or can be a fictitious test run PL. In the example shown, a simulation unit 13 is integrated in the test bench computing unit 12, which makes the target values of a corresponding predetermined test run PL available for controlling the test bench 30, i.e. for the test object 20 and the loading machine 3. The simulation unit 13 uses a simulation model 14, for example, to simulate a journey of a specific vehicle along a specific route with a specific driver, for which known interacting sub-models, such as a road model, a driver model, a route model, a tire model, etc., can also be provided. The simulation can also process actual values measured on the test bench 30, for example speeds and/or torques of the test object 20 and/or of the loading machine 3. Of course, the simulation unit 13 does not have to be provided as a separate physical unit; it could also be integrated in the test bench computing unit 12 in the form of software, for example. If the target values come from other sources, the simulation unit 13 could of course also be dispensed with.

Figure 2:
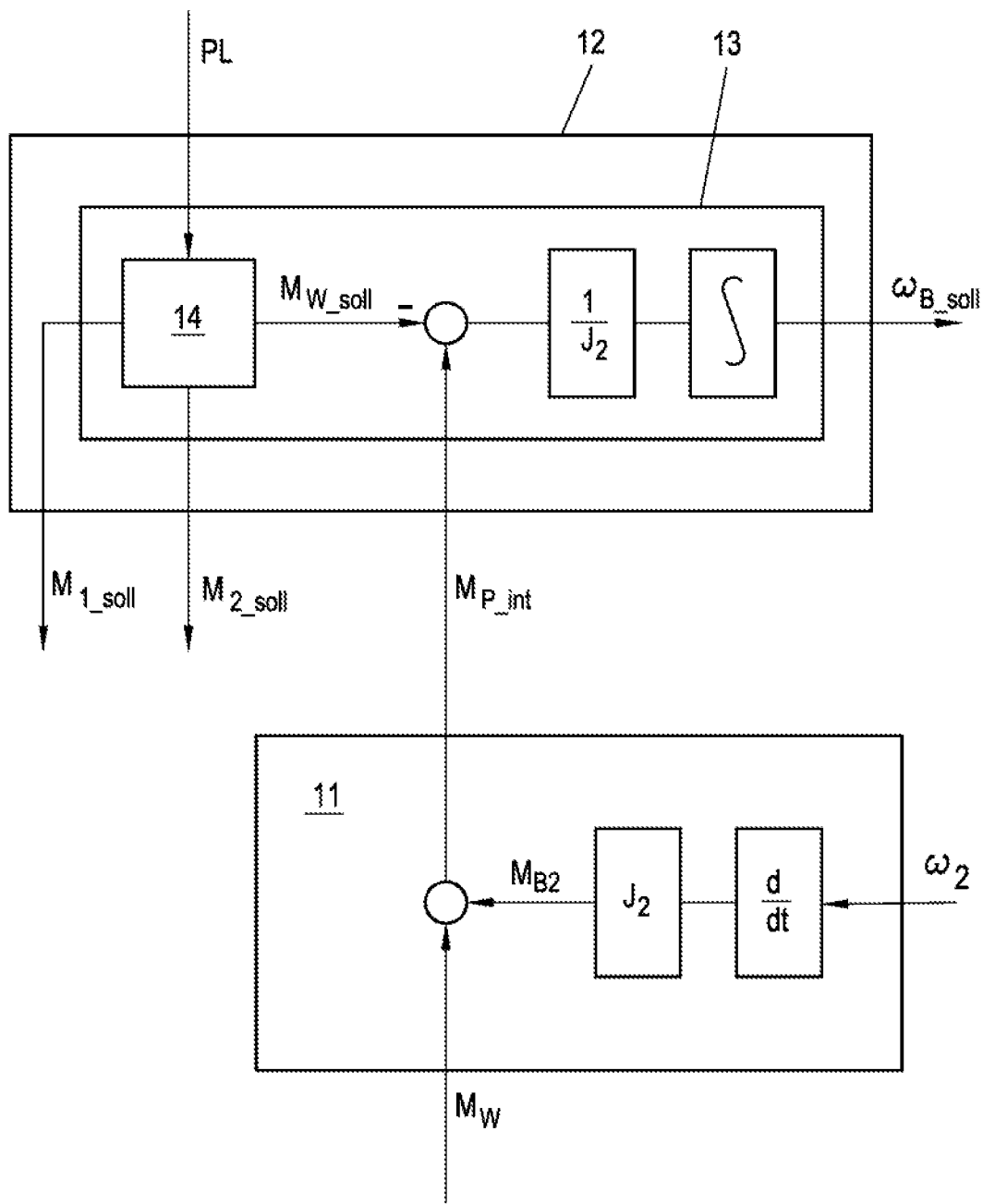
FIG. 2 shows the function of an observer and a test bench computing unit known in the prior art.

In the context of the invention, the test bench computing unit 12 processes a torque of the test object 20, but this torque cannot be measured directly, or this can be done only with difficulty. An observer 11 is therefore used which estimates the required torque from existing measurement variables, as shown in FIG. 2. For the observer 11, the torque sum around the electric motor (second rotating mass 2), which is connected to the loading machine 3 via the loading shaft 6, is applied. The torque estimated in the observer 11 is then the torque sum of the measured (or otherwise determined) shaft torque $M_W$ on the loading shaft 6 and the acceleration torque $M_{B2}$ which is required to accelerate the second rotating mass 2 (the electric motor) and is (preferably) derived from the measured speed $N_2$ (or angular speed $\omega_2$) of the second rotating mass 2 (electric motor) and its mass moment of inertia $J_2$.

The observer 11 thus estimates an internal test object torque $M_{P\_int}$ as the internal torque of the electric motor acting on the output shaft of the electric motor (second rotating mass 2) when the clutch 4 is open (if a clutch 4 is provided) and a sum of the internal torque of the electric motor and the torque transmitted in the clutch 4 (from the first rotating mass 1, in this case from the internal combustion engine) when the clutch 4 is closed. The speed Na of the loading machine 3 to be adjusted (as the target value $\omega_{B\_soll}$ for the loading machine 3) is determined with the mass moment of inertia $J_2$ of the electric motor from the difference between a target test object torque $M_{W\_soll}$ determined here in the simulation unit 13 and the internal test object torque $M_{P\_int}$ of the test object 20 that is estimated in the observer 11 and fed back. It was found here that, with this approach, instability can occur in the controlled system in the case of coupled rotating masses 1, 2, for example when the clutch 4 is closed or there are multiple connected rotating masses.

According to the invention, the observer 11 is therefore configured to determine a corrected internal effective test object torque $M_{P\_int\_korr}$ of the test object 20 in order to eliminate stability problems in the control, in particular when the clutch 4 is closed or in the case of rotating masses 1, 2 that are otherwise connected in a rotationally fixed manner. The corrected internal effective test object torque $M_{P\_int\_korr}$ is transmitted from the observer 11 to the test bench computing unit 12, or optionally to its test bench automation unit and/or the simulation unit 13 (if the test run is being simulated), in order to determine the target value $\omega_{B\_soll}$ of the loading machine 3. The observer 11 can again be implemented as suitable hardware and/or software. The observer 11 could of course also be integrated e.g. in the test bench computing unit 12 or the simulation unit 13 or in other components implemented in the test bench computing unit 12. The basic function of such an observer 11 is known in principle and only the special features in connection with the method according to the invention will be discussed below.

Figure 3:
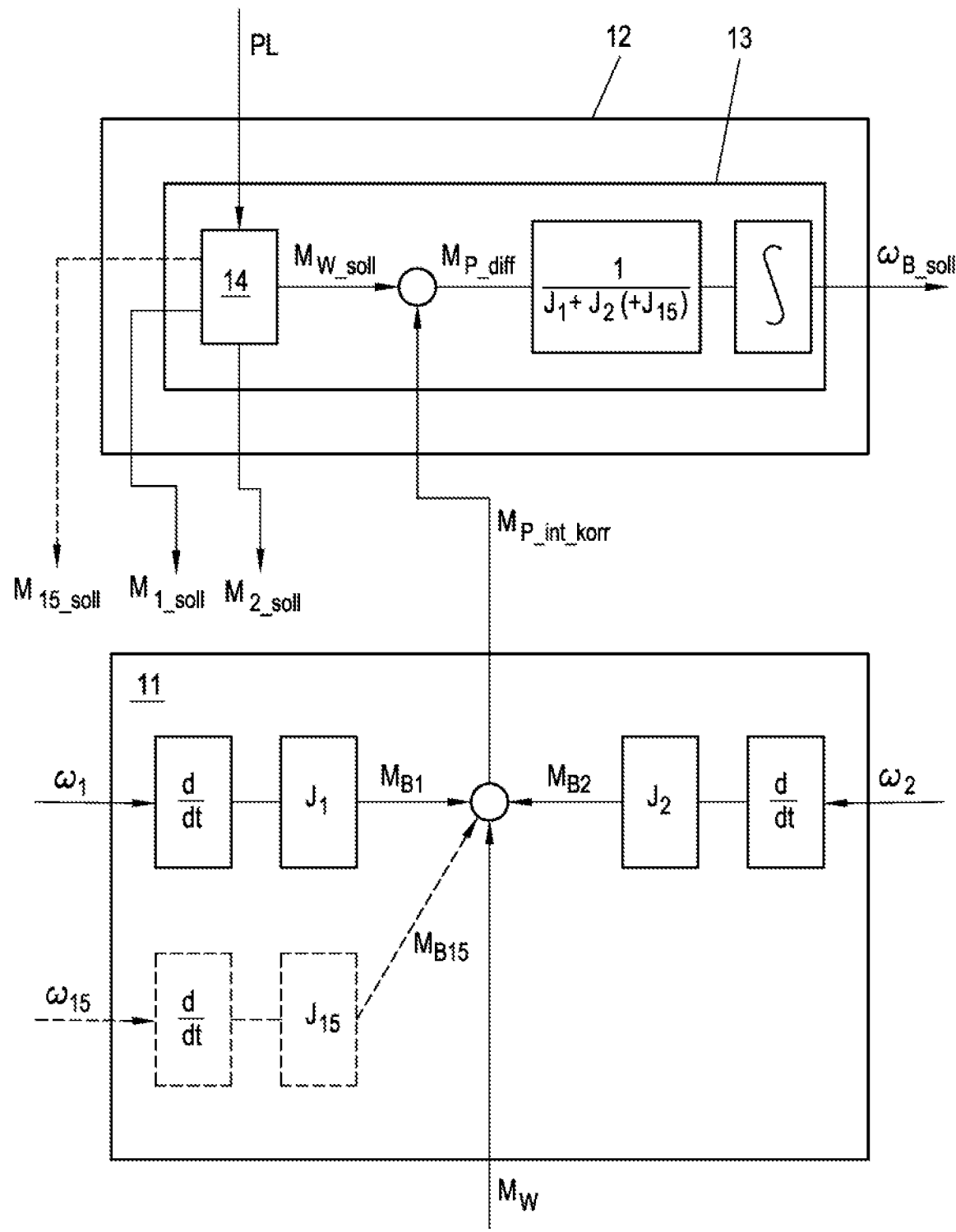
FIG. 3 shows the function of an observer and a test bench computing unit of a first embodiment.

FIG. 3 shows the interaction of the test bench computing unit 12 and the observer 11 according to a first embodiment of the method according to the invention in detail. In addition to the target torque $M_{1\_soll}$ of the internal combustion engine (as the first rotating mass 1 or torque generator) and the target torque $M_{2\_soll}$ of the electric motor (as the second rotating mass 2 or torque generator), the simulation unit 13 determines a target test object torque $M_{W\_soll}$, e.g. a target value for the torque on the loading shaft 6. However, this target test object torque $M_{W\_soll}$ does not necessarily have to be determined in the simulation unit 13, but can e.g. also be determined or specified in some other way. The target test object torque $M_{W\_soll}$ does not necessarily have to be the target shaft torque on the loading shaft 6, but could also be e.g. another external torque acting on the rotating mass 2, for example the torque of an electric motor not arranged on the test bench 30 or a torque converter.

Furthermore, the target test object torque $M_{W\_soll}$ could, for example, also take into account other torques that do not actually act on the rotating mass 2 on the test bench 30, such as a frictional torque of a component that is not actually built on.

The target value $\omega_{B\_soll}$ of the loading machine 3 is again determined from the difference between the target test object torque $M_{W\_soll}$ and the corrected internal effective test object torque $M_{P\_int\_korr}$ of the observer 11, a so-called differential torque $M_{P\_diff}$ which acts on the electric motor. The target loading machine speed $N_{B\_soll}$ can be determined according to the following formula by multiplying the differential torque $M_{P\_diff}$ by the reciprocal of the sum of the mass moments of inertia $J_i$ of the rotating masses 1, 2 of the test object 20 and integrating the result over time. When using an internal combustion engine as the first rotating mass 1 or torque generator and an electric motor as the second rotating mass 2 or torque generator (as shown in FIG. 1), the mass moments of inertia $J_i$ correspond to a mass moment of inertia $J_v$ of the internal combustion engine and a mass moment of inertia JE of the electric motor.

$$\omega_{B\_SOLL} = \int \frac{M_{P\_DIFF}}{\sum J_i} dt; \omega = 2\pi N$$

The target loading machine speed $N_{B\_soll}$ (and all other speeds in the following) can be determined via the known relationship $\omega = 2\pi N$ from the target loading machine angular speed $\omega_{B\_soll}$. Since the relationship between speed N and angular speed $\omega$ is known, speeds $N_i$ and angular speeds $\omega_i$ are used synonymously in the following.

The lower block in FIG. 3 shows the observer 11 for determining the corrected internal effective test object torque $M_{P\_int\_korr}$. The shaft torque $M_W$ measured here via the torque measuring device 10 on the loading shaft 6 is fed to the observer 11. Furthermore, the observer 11 is supplied with the measured angular speeds $\omega_i$ (or speeds $N_i$) of the rotating masses 1, 2, e.g. an internal combustion engine angular speed $\omega_v$ (or internal combustion engine speed $N_v$) and an electric motor angular speed $\omega_E$ or (electric motor speed $N_E$). The speeds $N_i$ are preferably determined by means of suitable measuring devices on the test bench 30, for example by direct measurement on the relevant rotating mass 1, 2 or by measurement on an adjacent rotating mass (if the rigidity of the rotationally fixed connection is sufficiently high). The speeds $N_i$ could, however, also be provided directly by a test object control unit 21, e.g. by the internal combustion engine control unit 7 and the electric motor control unit 8. The corrected internal effective torque $M_{P\_int\_korr}$ corresponds to the sum of the internal torques $M_{i\_int}$ generated by the torque generators, which act directly on the corresponding rotating masses of the torque generators.

The acceleration torques $M_{B1}$, $M_{B2}$ required to accelerate the rotating masses 1, 2 are added up, with the correct sign, with the recorded shaft torque $M_W$ (and thus eliminated from the corrected internal effective test object torque $M_{P\_int\_korr}$), which leaves the sum of the internal torques. However, in order to still represent a correct total energy of the test object 20 (despite the elimination of the acceleration torques $M_{B1}$, $M_{B2}$), the inertias of both rotating masses 1, 2 are therefore taken into account in the form of the corresponding mass moments of inertia $J_1$, $J_2$ (in this case as the mass moment of inertia $J_v$ of an internal combustion engine and as the mass moment of inertia $J_E$ of an electric motor) when calculating the target value $\omega_{B\_soll}$ of the loading machine 3 (or target loading machine speed $N_{B\_soll}$), which takes place, for example, in the simulation unit 13, as shown in FIG. 3.

Instead of the actual mass moments of inertia $J_1$, $J_2$, simulated mass moments of inertia $J_{1\_sim}$, $J_{2\_sim}$, for example, could also be used in the simulation unit 13. A simulated mass moment of inertia $J_{i\_sim}$ is generally to be understood as a mass moment of inertia representing a rotating mass. For example, a mass moment of inertia differing from the actual mass moment of inertia $J_1$, $J_2$, ... $J_i$ of the test object 20 set up on the test bench 30 could be used, or a variable mass moment of inertia that can change dynamically, e.g. while the test run is being carried out. The calculated target loading machine angular speed $\omega_{B\_soll}$ is then adjusted by the loading machine control unit 9 on the test bench 30. At this point it should be mentioned again that the selected representation is only an example and that the observer 11, analogously to the simulation unit 13, can of course also be integrated in another system, e.g. in the test bench computing unit 12 in the form of software.

When the clutch 4 is open, the consideration of the mass moment of inertia $J_1$ of the first rotating mass 1 in the observer 11 and in the simulation unit 13 can be dispensed with and the result is the embodiment according to the prior art in FIG. 2. The angular accelerations required to determine the acceleration torques $M_{B1}$, $M_{B2}$ do not necessarily have to be determined as shown in FIG. 3 via a time derivative of the preferably measured speeds $N_1$, $N_2$, but a direct or indirect measurement of the angular accelerations would of course also be conceivable, e.g. by means of suitable acceleration sensors.

Stable control of the test object 20 and the loading machine 3 on the test bench 30 can be achieved with the described first embodiment of the method according to the invention. However, it may be disadvantageous here that, due to the larger simulated rotating mass in the simulation unit 13, natural frequencies of the simulated drive train are not realistically represented, and that torsional oscillations of the first rotating mass 1 (in particular when using an internal combustion engine) act unrealistically on the simulated rotating mass (sum of the moments of inertia $J_i$) in the simulation unit 13, since the decoupling of the torsional oscillations of the first rotating mass 1 by the connecting element 5, in this case the connecting shaft, and the clutch 4 is not taken into account in the simulation unit 13. In order to remedy these disadvantages, the method can be further improved, as is explained below with reference to FIG. 4.

FIG. 4 shows the interaction of the observer 11 and the simulation unit 13 implemented in the test bench computing unit 12 for determining the target loading machine speed $N_{B\_soll}$ (or target loading machine angular speed $\omega_{B\_soll}$), as already described for FIG. 3. In the observer 11, the corrected internal effective test object torque $M_{P\_int\_korr}$ is determined substantially analogously to FIG. 3, but with the difference that, when determining the acceleration torque $M_{B1}$ of the internal combustion engine (first rotating mass 1), the internal combustion engine speed $N_v$ (or $\omega_v$) is filtered by means of a suitable, optional filter F in order to filter speed oscillations. This is particularly advantageous in an internal combustion engine in order to filter combustion shocks from the internal combustion engine speed $N_v$. Any suitable filter can be used as the filter, for example an average value filter such as a known CASMA filter. Of course, the filtering is not limited to the speed $N_i$ (or $\omega_i$), for example, an angular acceleration calculated therefrom or an acceleration torque $M_i$ could also be filtered.

The corrected internal effective test object torque $M_{P\_int\_korr}$ Of the observer 11 is fed back to the test bench computing unit 12, in particular to the simulation unit 13 in this case. The target test object torque $M_{W\_soll}$, such as the target shaft torque on the loading shaft 6, is fed to the simulation unit 13 in accordance with a predetermined test run PL. In contrast with the first embodiment of the invention according to FIG. 3, not the mere sum of the mass moments of inertia Ji of the rotating masses 1, 2 (in this case mass moment of inertia $J_v$ of the internal combustion engine and mass moment of inertia $J_E$ of the electric motor) is used to determine the target value $\omega_{B\_soll}$ of the loading machine 3, but rather the mass moments of inertia $J_i$ are connected by means of a virtual connecting element VW in order to simulate the oscillation behavior of the real connecting element 5 (and in this case also the clutch 4) according to the real test bench setup.

As can be seen in FIG. 4, a simulated connecting element torque $M_{VW\_SIM}$ is fed back in the simulation unit 13 and multiplied by the reciprocal of the mass moment of inertia $J_1$ of the first rotating mass 1 (in this case mass moment of inertia $J_v$ of the internal combustion engine) and integrated over time. A sum with the correct sign is formed from the resulting angular speed and the fed-back target loading machine angular speed $\omega_{B\_soll}$ and fed to the virtual connecting element VW. The simulated connecting element torque $M_{VW\_SIM}$ simulates the torque on the connecting element 5, in this case on the connecting shaft between the first rotating mass 1 and the second rotating mass 2 (in this case internal combustion engine and electric motor) in the real test bench setup on the test bench 30.

The virtual connecting element VW has particular mechanical properties for simulating the oscillation behavior of the real connecting element 5 (and possibly the clutch 4). For example, the mechanical properties can be the combination of a (torsional) spring constant $c_{VW}$ and a damping coefficient $d_{VW}$ shown in FIG. 4a, whereby the actual values of the spring constant $c_{VW}$ and the damping coefficient $d_{VW}$ depend on the specific design of the test object 20, in particular of the real connecting element 5 and possibly the clutch 4, and are determined accordingly. The mechanical properties of the real connecting element 5 may of course differ considerably. For example, a toothed or wedge belt generally has a different spring constant $c_{VW}$ and a different damping coefficient $d_{VW}$ than a connecting shaft or a chain. If the fed-back corrected internal effective test object torque $M_{P\_int\_korr}$ is already reduced by the damping losses present on the test bench 30, the damping coefficient $d_{VW}$ of the virtual connecting element VW can also be disregarded.

However, it should be noted that, due to the simplified representation of the clutch 4 by means of the virtual connecting element VW, not all the oscillation effects of the real clutch 4 can be taken into account. For example, the real clutch 4 can have a relatively low rigidity at low torques to be transmitted, which is comparable to the behavior of a known dual-mass flywheel ZMS.

The excitation by the first rotating mass 1 (in this case the internal combustion engine in combustion frequency) takes place in accordance with the real arrangement on the test bench 30 on the second rotating mass 2 (in this case the electric motor). This means that the corrected internal effective test object torque $M_{P\_int\_korr}$ in the simulation unit 13 acts directly on the mass moment of inertia $J_2$ of the second rotating mass 2 (in this case mass moment of inertia $J_E$ of the electric motor), as can be seen in FIG. 4. The target loading machine angular speed $\omega_{B\_soll}$ (or target loading machine speed $N_{B\_soll}$) is calculated in the second embodiment shown by adding the corrected internal effective test object torque $M_{P\_int\_korr}$, the specified target test object torque $M_{W\_soll}$ and the simulated connecting element torque $M_{VW\_SIM}$, with the correct sign, to form a second differential torque $M'_{P\_Diff}$. The second differential torque $M'_{P\_Diff}$ is finally multiplied by the reciprocal of the mass moment of inertia $J_2$ of the second rotating mass 2 (in this case the electric motor) and integrated over time.

In the case of an internal combustion engine, the rotating mass of the internal combustion engine changes the oscillation behavior only slightly in relation to the combustion frequency of the internal combustion engine, because the combustion frequency is well above the natural frequency between the internal combustion engine and the second rotating mass 2 (in this case the electric motor). The speed behavior of the second rotating mass 2 (in this case the electric motor) therefore almost corresponds to the real speed behavior in the vehicle.

However, the described second embodiment of the method according to the invention can have the disadvantage that, in the case of an accelerating torque of the first rotating mass 1 (in this case internal combustion engine torque $M_V$ of the internal combustion engine) in the simulation in the simulation unit 13, there is a slightly increased dynamic of the test object 20 compared to the real application in the vehicle because the internal torque of the first rotating mass 1 (internal combustion engine torque) determined in the observer 11 and filtered by means of the filter F acts directly on the second rotating mass 2 (mass moment of inertia $J_E$ of the electric motor) and not on the decoupled first rotating mass 1 (in this case mass moment of inertia $J_v$ of the internal combustion engine), as can be seen in FIG. 4. The internal torque of the first rotating mass 1 (in this case the internal combustion engine torque) is contained in the corrected internal effective test object torque $M_{P\_int\_korr}$ and acts in the simulation unit 13 directly on the mass moment of inertia $J_2$ of the second rotating mass 2 (in this case mass moment of inertia $J_E$ of the electric motor). In order to eliminate this disadvantage, the method can be improved even further, as will be shown below with reference to FIG. 5.

In the method according to FIG. 5, the determination of the corrected internal effective test object torque $M_{P\_int\_korr}$ in the observer 11 substantially corresponds to the first embodiment which was explained with reference to the observer 11 shown in FIG. 3. However, the corrected internal effective test object torque $M_{P\_int\_korr}$ is now added up with an estimated internal torque $\hat{M}_{2\_INT}$ of the second rotating mass 2 (in this case estimated internal electric motor torque $\hat{M}_{E\_INT}$), with the correct sign, to form an estimated internal torque $\hat{M}_{1\_INT}$ of the first rotating mass 1 (in this case estimated internal combustion engine torque $\hat{M}_{V\_INT}$) The estimated internal torque $\hat{M}_{1\_INT}$ of the first rotating mass 1 (estimated internal combustion engine torque $\hat{M}_{V\_INT}$) is fed to the simulation unit 13, where it acts directly on the mass moment of inertia $J_1$ of the first rotating mass 1 (in this case the mass moment of inertia $J_v$ of the internal combustion engine) (and not, as in FIG. 4, on the mass moment of inertia $J_2$ of the second rotating mass 2, in this case the mass moment of inertia $J_E$ of the electric motor).

The estimated internal torque $\hat{M}_{2\_INT}$ of the second rotating mass 2 (in this case estimated internal electric motor torque $\hat{M}_{E\_INT}$) is fed by the observer 11 to the simulation unit 13, where it acts directly on the mass moment of inertia $J_2$ of the second rotating mass 2 (in this case mass moment of inertia $J_E$ of the electric motor). This allows the oscillation behavior of the test object 20 to be simulated realistically, and, in the case of an internal combustion engine as the first rotating mass 1, it is advantageous for stable control that all signals entering the observer 11 contain the combustion frequency of the internal combustion engine with the same amplification and that the phase position of the signals is consistent. The estimated internal electric motor torque $\hat{M}_{E\_INT}$ can for example be determined from the manipulated variable of the electric motor 1a or from an actual electric motor torque that has been fed back.

The target loading machine angular speed $\omega_{B\_soll}$ (or target loading machine speed $N_{B\_soll}$) is calculated in the third embodiment shown by adding up the estimated internal torque $\hat{M}_{2\_INT}$ of the second rotating mass 2 (in this case estimated internal electric motor torque $\hat{M}_{E\_INT}$), the specified target test object torque $M_{W\_soll}$ and the simulated connecting element torque $M_{VW\_SIM}$, with the correct sign, to form a third differential torque $M'''_{P\_Diff}$ and by the third differential torque $M'''_{P\_Diff}$ being multiplied by the reciprocal of the mass moment of inertia $J_2$ of the second rotating mass 2 (in this case mass moment of inertia $J_E$ of the electric motor) and integrated over time. The simulated connecting element torque $M_{VW\_SIM}$ is determined in this case by forming a sum, with the correct sign, of the fed-back simulated connecting element torque $M_{VW\_SIM}$ and the estimated internal torque $\hat{M}_{1\_INT}$ of the first rotating mass 1 (in this case estimated internal combustion engine torque $\hat{M}_{V\_INT}$), multiplying it by the reciprocal of the mass moment of inertia $J_1$ of the first rotating mass 1 (in this case mass moment of inertia $J_V$ of the internal combustion engine) and integrating it over time. The angular speed resulting therefrom and the fed-back target loading machine angular speed $\omega_{B\_soll}$ are added up, with the correct sign, and fed to the virtual connecting element VW, which in turn has corresponding mechanical properties. The mechanical properties of the virtual connecting element VW can be applied analogously to FIG. 4a.

Figure 6:
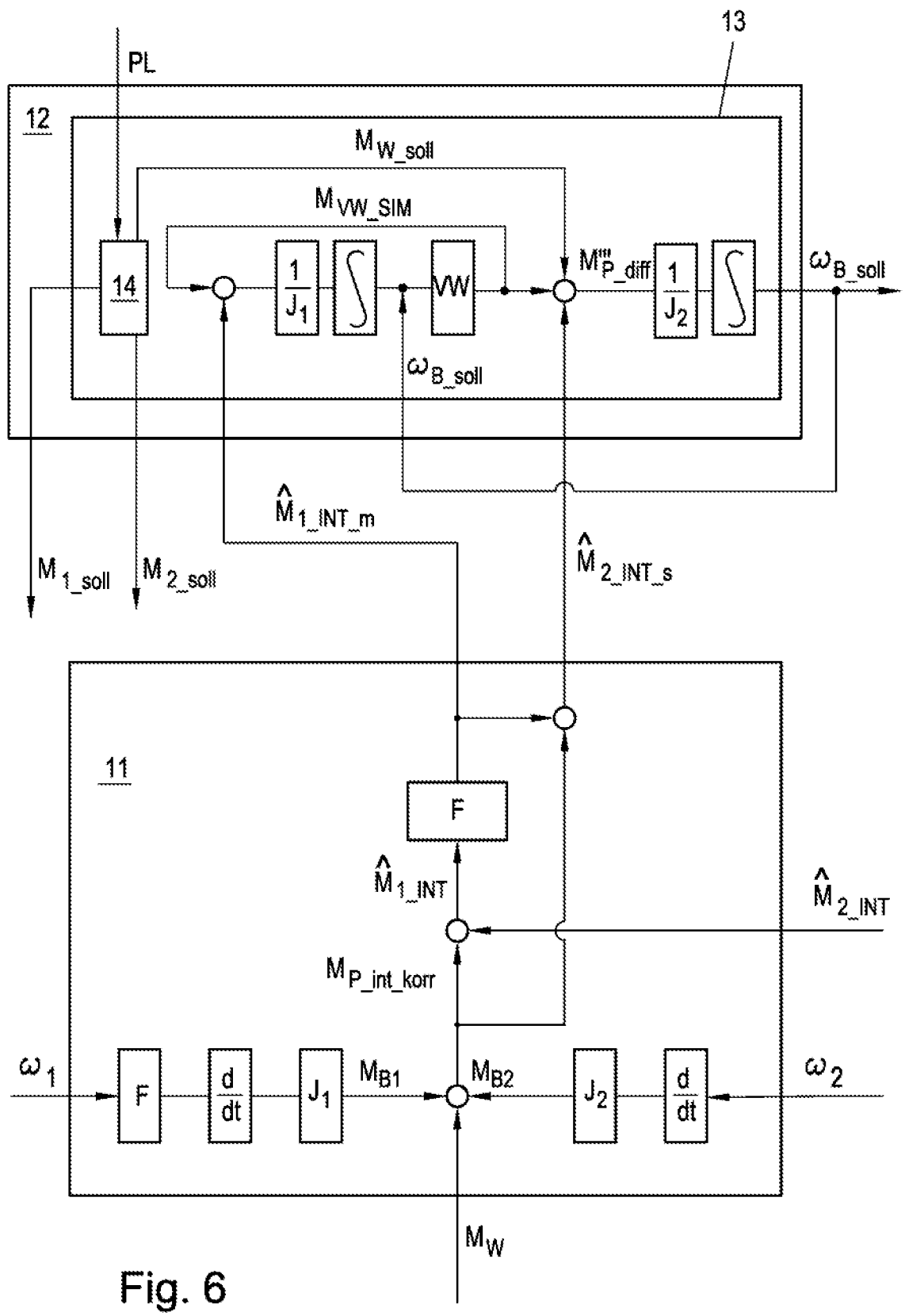
FIG. 6 shows the function of an observer and a test bench computing unit of a fourth embodiment.

If, however, the estimated internal electric motor torque $\hat{M}_{E\_INT}$, or generally the estimated internal torque $\hat{M}_{2\_INT}$ of the second rotating mass 2, is only available in a less dynamic form (for example in the form of an averaged torque or a target torque of a higher-level control unit such as the test object control unit 21) and the second rotating mass 2 (in this case the electric motor) is also used to compensate for combustion oscillations, the method can be expanded, as will be explained below with reference to FIG. 6.

In the embodiment of FIG. 6, the determination of the corrected internal effective test object torque $M_{P\_int\_korr}$ in the observer 11 substantially corresponds to the first embodiment explained on the basis of the observer 11 shown in FIG. 4, in which the angular speed $\omega_1$ or speed $N_1$ of the first rotating mass 1 (in this case internal combustion engine speed $N_V$) is filtered by means of a filter F, in particular in order to filter combustion shocks of the internal combustion engine. The corrected internal effective test object torque $M_{P\_int\_korr}$ therefore still contains oscillations in the combustion frequency of the internal combustion engine which are introduced via the measured shaft torque $M_W$ and via the measured speed $N_2$ or angular speed $\omega_2$ of the second rotating mass 2 (in this case the electric motor). The corrected internal effective test object torque $M_{P\_int\_korr}$ and an estimated internal torque $\hat{M}_{2\_INT}$ of the second rotating mass 2 (in this case the electric motor) are added up, with the correct sign, to form an estimated internal torque $\hat{M}_{1\_INT}$ of the first rotating mass 1 (in this case estimated internal combustion engine torque $\hat{M}_{V\_INT}$) (analogously to FIG. 5).

In order to determine an estimated average internal torque $\hat{M}_{1\_INT\_M}$ of the first rotating mass 1 (in this case estimated average internal combustion engine torque $\hat{M}_{V\_INT\_M}$), the estimated internal torque $\hat{M}_{1\_INT}$ of the first rotating mass 1 (in this case estimated internal combustion engine torque $\hat{M}_{V\_INT}$) is filtered again by means of a filter F in order to filter oscillations, in particular combustion shocks of the internal combustion engine which are introduced into the observer 11 via the measured shaft torque $M_W$ and the measured speed $N_2$ or angular speed $\omega_2$ of the second rotating mass 2 (in this case the electric motor). The determined estimated average internal torque $\hat{M}_{1\_INT\_M}$ of the first rotating mass 1 (in this case estimated average internal combustion engine torque $\hat{M}_{V\_INT\_M}$) and the corrected internal effective test object torque $M_{P\_int\_korr}$ are added, with the correct sign, to form an oscillating estimated internal torque $\hat{M}_{2\_INT\_S}$ of the second rotating mass 2 (in this case oscillating estimated internal electric motor torque $\hat{M}_{E\_INT\_S}$), which also contains the oscillations introduced via the measured shaft torque $M_W$ and the measured speed $N_2$ or angular speed $\omega_2$ of the second rotating mass 2 or electric motor. The determined oscillating estimated internal torque $\hat{M}_{2\_INT\_S}$ of the second rotating mass 2 (in this case oscillating estimated internal electric motor torque $\hat{M}_{E\_INT\_S}$) and the determined estimated average internal torque $\hat{M}_{1\_INT\_M}$ of the first rotating mass 1 (in this case estimated average internal combustion engine torque $\hat{M}_{V\_INT\_M}$) are fed to the simulation unit 13 for calculating the target loading machine angular speed $\omega_{B\_soll}$ (or target loading machine speed $N_{B\_soll}$).

The target loading machine angular speed $\omega_{B\_soll}$ (or target loading machine speed $N_{B\_soll}$) is calculated here by adding up the oscillating estimated internal torque $\hat{M}_{2\_INT\_S}$ of the second rotating mass 2 (in this case oscillating estimated internal electric motor torque $\hat{M}_{E\_INT\_S}$), the specified target test object torque $M_{W\_soll}$ and the simulated connecting element torque $M_{VW\_SIM}$, with the correct sign, to form a fourth differential torque $M''''_{P\_Diff}$. The fourth differential torque $M''''_{P\_Diff}$ is multiplied by the reciprocal of the mass moment of inertia $J_2$ of the second rotating mass 2 (in this case mass moment of inertia $J_E$ the electric motor) and integrated over time.

The simulated connecting element torque $M_{VW\_SIM}$ is determined in this case by forming a sum, with the correct sign, of the fed-back simulated connecting element torque $M_{VW\_SIM}$ and the estimated average internal torque $\hat{M}_{1\_INT\_M}$ of the first rotating mass 1 (in this case estimated average internal combustion engine torque $\hat{M}_{V\_INT\_M}$), which is multiplied by the reciprocal of the mass moment of inertia $J_1$ of the first rotating mass 1 (in this case mass moment of inertia $J_V$ of the internal combustion engine) and integrated over time. The angular speed resulting therefrom and the fed-back target loading machine angular speed $\omega_{B\_soll}$ are added up, with the correct sign, and fed to the virtual connecting element VW, which in turn has corresponding mechanical properties. The mechanical properties of the virtual connecting element VW can be applied analogously to FIG. 4a.

For a better understanding, the present invention has been described on the basis of the specific configuration of the test object 20 as a P2 unit. The embodiment thus shows a specific practical application which, however, is not to be understood as limiting the invention. The invention also includes any other arrangement that has at least two rotating masses 1, 2, ... x connected in a rotationally fixed manner as a test object 20, with at least one of the rotating masses 1, 2, ... x being connected to a loading machine 9 via a loading shaft 6. For example, three or more rotating masses 1, 2, ... x could also be provided, each of which is connected by means of a connecting element 5.

In the example shown, for example a third rotating mass 15 could be connected to the left of the first rotating mass 1 (in this case designed as a torque generator or internal combustion engine 1) by means of a second connecting element 5a. The third rotating mass 15 could again be a torque generator or a passive, non-driven rotating mass. The second connecting element 5a can in turn be a connecting shaft or some other type of rotationally fixed connection, for example said belt or a chain. Consequently, the third rotating mass 15 would be added to the method in an obvious manner. In the example according to FIG. 3, this would mean, for example, that this is taken into account analogously to the first and second rotating mass 1, 2 in the observer 11 when determining the corrected internal effective test object torque $M_{P\_int\_korr}$. Thus, the shaft torque $M_W$ measured on the loading shaft 6 would additionally be corrected by an acceleration torque $M_{B15}$ for accelerating the third rotating mass 15, as indicated by dashed lines. The acceleration torque $M_{B15}$ could in turn be calculated from the time derivative of the speed $N_{15}$ or angular speed $\omega_{15}$ (or alternatively from a measured angular acceleration) and the mass moment of inertia $J_{15}$.

The calculation of the loading machine speed $N_{B\_soll}$ in the simulation unit 13 could be achieved analogously by multiplying the differential torque $M_{P\_diff}$ by the reciprocal of the sum of the mass moments of inertia $J_i$ of the rotating masses of the test object 20 and integrating the result over time. The mass moment of inertia $J_{15}$ of the third rotating mass 15 must now also be taken into account in the sum of the mass moments of inertia $J_i$ of the rotating masses. If the third rotating mass 15 is a torque generator, a further (third) control unit (not shown) is of course preferably provided for controlling the third torque generator. The third control unit can of course in turn be integrated in the test object control unit 21. The third control unit can in turn receive target values from the simulation model 14, for example a target torque $M_{15\_soll}$, as indicated by dashed lines in FIG. 3, and use them to calculate a manipulated variable for the torque generator. The embodiments according to FIG. 4-FIG. 6 can of course be expanded in a similar manner to include one or more active rotating masses (torque generators) or passive rotating masses. For this purpose, the specific structure of the test object 20 on the test bench 30 must of course be taken into account in the simulation unit 13. If, for example, as mentioned, a third rotating mass 15 is connected to the first rotating mass 1 (or the internal combustion engine) via a second connecting element 5a (e.g. a connecting shaft) in a rotationally fixed manner (see FIG. 1, indicated by dashed lines), the actual mass moment of inertia $J_{15}$ of the third rotating mass 15 (or a simulated mass moment of inertia $J_{15\_sim}$ representing a specific rotating mass) and a second virtual connecting element VW2 are to be taken into account in the simulation unit 13. The second virtual connecting element VW2 naturally again has particular mechanical properties, in particular a spring constant $c_{VW}$ and a damping coefficient $d_{VW}$.

By way of example, the embodiment described with reference to FIG. 4 is expanded to include a third rotating mass 15 and is explained in detail below with reference to FIG. 7.

FIG. 7 shows the interaction between the observer 11 and the test bench computing unit 12 for determining the target loading machine speed $N_{B\_soll}$ (or target loading machine angular speed $\omega_{B\_soll}$) in a manner analogous to that already described for FIG. 4, but with the addition of a third rotating mass 15. The corrected internal effective test object torque $M_{P\_int\_korr}$ is determined substantially analogously in the observer 11, as indicated by dashed lines in FIG. 3. The corrected internal effective test object torque $M_{P\_int\_korr}$ of the observer 11 is fed back to the test bench computing unit 12, in particular to the simulation unit 13 in this case. The target test object torque $M_{W\_soll}$ is fed to the simulation unit 13 in accordance with a predetermined test run PL (or from another source).

In contrast with the first embodiment of the invention according to the dashed addition in FIG. 3, the mere sum of the mass moments of inertia $J_i$ of the rotating masses 1, 2, 15 is not used to determine the target value $\omega_{B\_soll}$ of the loading machine 3, but the mass moments of inertia $J_i$ are connected by means of virtual connecting elements VW, VW2 in order to simulate the oscillation behavior of the real connecting elements 5, 5a according to the real test bench setup. As can be seen in FIG. 7, a simulated connecting element torque $M_{VW\_SIM}$ of the virtual connecting element VW is fed back in the simulation unit 13 and multiplied by the reciprocal of the mass moment of inertia $J_1$ of the first rotating mass 1 and integrated over time. A sum with the correct sign is formed from the resulting angular speed $\omega_{1\_sim}$ and the fed-back target loading machine angular speed $\omega_{B\_soll}$ and fed to the virtual connecting element VW. The simulated connecting element torque $M_{VW\_SIM}$ simulates the torque on the connecting element 5, in this case on the connecting shaft between the first rotating mass 1 and the second rotating mass 2 (e.g. internal combustion engine and electric motor) in the real test bench setup on the test bench 30.

The virtual connecting element torque $M_{VW2\_sim}$ of the virtual connecting element VW2 is determined by the simulated connecting element torque $M_{VW2\_sim}$ of the virtual connecting element VW2 being fed back in the simulation unit 13 and being multiplied by the reciprocal of the mass moment of inertia $J_{15}$ of the third rotating mass 15 and integrated over time. A sum with the correct sign is formed from the resulting angular speed $\omega_{15}$ and the fed-back angular speed $\omega_{1\_sim}$ and fed to the virtual connecting element VW2, as shown in FIG. 7.

The virtual connecting elements VW, VW2 in turn have particular mechanical properties in order to simulate the oscillation behavior of the real connecting elements 5, 5a (and possibly the clutch 4 and/or a further clutch (not shown)) between the first and the third rotating mass 1, 15). For example, the mechanical properties can be the combination of a (torsional) spring constant $c_{VW}$ and a damping coefficient $d_{VW}$ shown in FIG. 4a, whereby the actual values of the spring constant $c_{VW}$ and the damping coefficient $d_{VW}$ depend on the specific design of the test object 20, in particular of the real connecting elements 5, 5a and possibly present clutch(es) 4, and are determined accordingly. The mechanical properties of the real connecting element 5 may of course also differ from the mechanical properties of the real connecting element 5a, depending on the specific configuration of the real connecting elements 5, 5a. For example, a toothed or wedge belt generally has a different spring constant $c_{VW}$ and a different damping coefficient $d_{VW}$ than a connecting shaft or a chain.

The excitation by the first and the third rotating mass 1, 15 takes place in accordance with the real arrangement on the test bench 30 on the second rotating mass 2. This means that the corrected internal effective test object torque $M_{P\_int\_korr}$ in the simulation unit 13 acts directly on the mass moment of inertia $J_2$ of the second rotating mass 2, as can be seen in FIG. 7. The target loading machine angular speed $\omega_{B\_soll}$ (or target loading machine speed $N_{B\_soll}$) is calculated in the second embodiment shown by adding the corrected internal effective test object torque $M_{P\_int\_korr}$, the specified target test object torque $M_{W\_soll}$ and the simulated connecting element torque $M_{VW\_SIM}$, with the correct sign, to form a second differential torque $M'_{P\_Diff}$. The second differential torque $M'_{P\_Diff}$ is finally multiplied by the reciprocal of the mass moment of inertia $J_2$ of the second rotating mass 2 and integrated over time.

If, for example, a clutch (not shown) is provided on the second connecting element 5a between the first rotating mass 1 and the third rotating mass 15, the third rotating mass 15 can be decoupled from the first rotating mass 1. For the control, decoupling the third rotating mass 15 would of course mean that the third rotating mass 15 is not taken into account when determining the corrected internal effective test object torque $M_{P\_int\_korr}$ in the observer 11 and when determining the target loading machine speed $N_{B\_soll}$ in the simulation unit 13.

Figure 5:
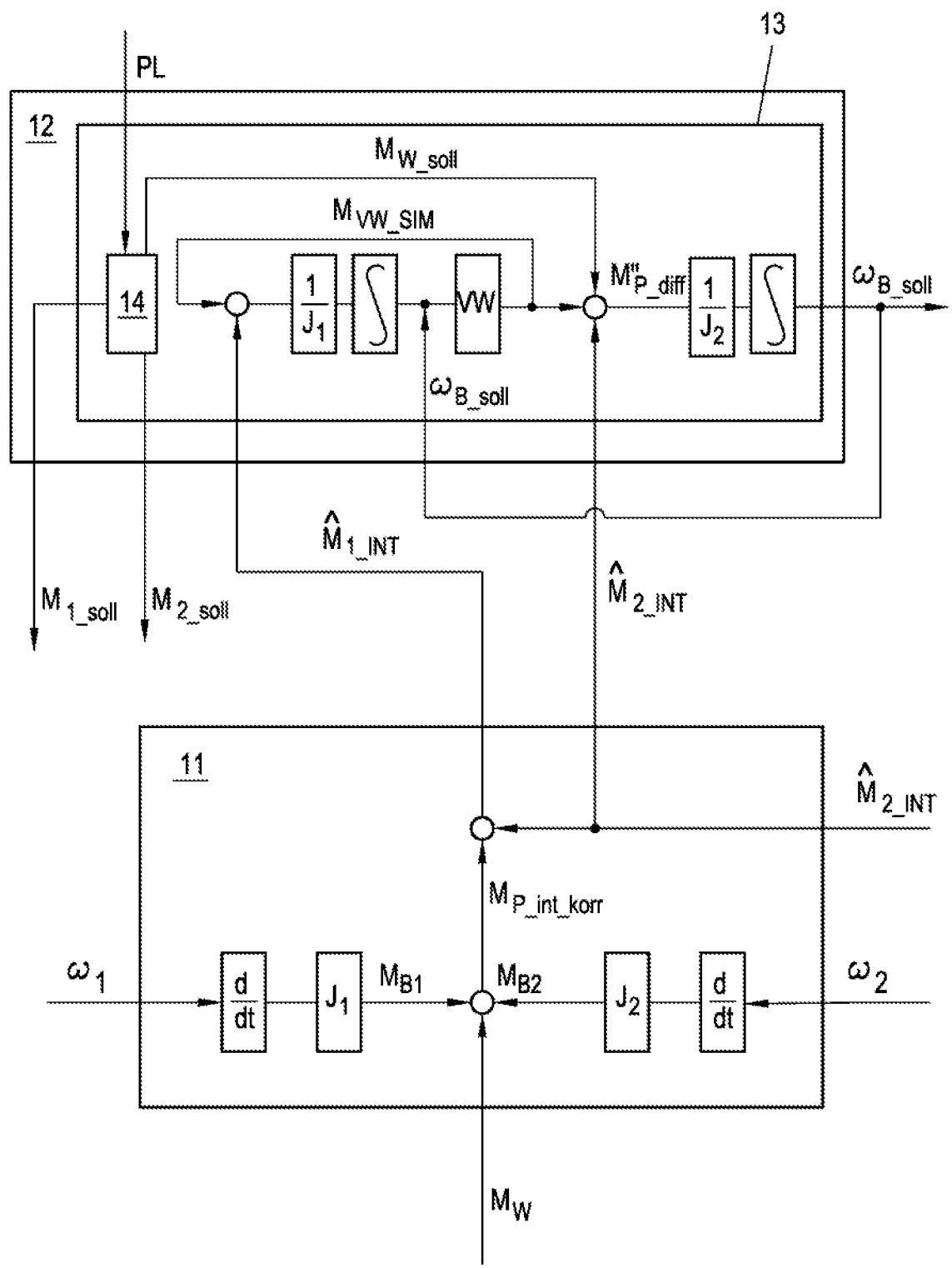
FIG. 5 shows the function of an observer and a test bench computing unit of a third embodiment.

Of course, the embodiments shown in FIG. 5 and FIG. 6 can also be extended analogously to include one or more further rotating masses. In FIG. 8, the extension of the method according to FIG. 5 by a third rotating mass 15 is shown by way of example. The estimated internal torque $\hat{M}_{2\_INT}$ of the second rotating mass 2 can be estimated in the case of an electric motor e.g. as an estimated internal electric motor torque $\hat{M}_{E\_INT}$ from the manipulated variable of the electric motor. The estimated internal torque $\hat{M}_{15\_INT}$ of the third rotating mass 15 could e.g. be a known frictional torque of a passive rotating mass 15 connected to the first rotating mass 1 (see FIG. 1) and could for example be estimated from a predetermined characteristic curve. Since the addition of one or more rotating masses is a professional action for a person skilled in the art, a detailed description is not given here and reference is made to the explanations relating to FIG. 5 and FIG. 6.

The method according to the invention can advantageously also be used for a test object 20 which has an internal combustion engine with a dual-mass flywheel. The dual-mass flywheel has a primary flywheel and a secondary flywheel which are connected in a rotationally fixed manner via a torsional oscillation damper. The primary flywheel is coupled to the internal combustion engine and, together with the internal combustion engine, forms the first rotating mass 1 according to the invention. The secondary flywheel forms the second rotating mass 2 and is connected to the loading machine via the loading shaft 6. For the rotationally fixed connection by the torsional oscillation damper, a virtual connecting element VW having corresponding mechanical properties must in turn be set up in the simulation unit 13 in order to represent the dual-mass flywheel as realistically as possible. The method steps remain basically the same.

Furthermore, it would be conceivable for more than one loading machine 3 to be provided on the test bench 30, each of which is connected to the test object 20 via a loading shaft 6 for driving or loading the test object 20. For example, a transmission having multiple rotating masses 1, 2, . . . x, each connected in a rotationally fixed manner via a connecting element 5, could be provided as the test object 20, the transmission input being connected to a first loading machine 3 via a first loading shaft 6 and the transmission output being connected to a second loading machine 3 via a second loading shaft 6. The two loading machines 3 are each controlled by a loading machine control unit 9 (or a common loading machine control unit). The method according to the invention can be used to control one of the two loading machines 3, with the other loading machine 3 in question being controlled conventionally, for example by controlling the speed measured on the relevant loading machine 3. If the shaft torque $M_W$ in the loading shaft 6 is also determined on the loading machine 3 that is not operated with the method according to the invention, this shaft torque $M_W$ is preferably additionally used to calculate the corrected internal effective test object torque $M_{P\_int\_korr}$ in order to control the other loading machine 3 in question with the method according to the invention.

The invention claimed is:

1. Method for operating a test bench with a test object having at least two rotating masses which are connected in a rotationally fixed manner and each have a mass moment of inertia (J1, J2), with at least one of the at least two rotating masses being connected by means of a loading shaft to a loading machine for driving or loading the test object, the loading machine being controlled by a loading machine control unit, the method including the following steps:

applying loads to the test object on the test bench,
estimating an internal test object torque (MP_int) and based upon the internal test object torque, determining a target loading machine speed (NB_soll) that is adjusted by the loading machine control unit,
determining a shaft torque (MW) acting in the loading shaft for the loading shaft,
determining acceleration torques (MB1, MB2) for accelerating the at least two rotating masses,
adding the shaft torque with the correct sign to the acceleration torques, to form a corrected internal effective test object torque (MP_int_korr), and
determining the target loading machine speed (NB_soll) from the corrected internal effective test object torque (MP_int_korr) or a torque derived therefrom (, , ,), a specified target test object torque (MW_soll) and from the mass moments of inertia (J1, J2) or simulated mass moments of inertia (J1_sim, J2_sim) of the at least two rotating masses.

2. The method according to claim 1, further comprising measuring the shaft torque (MW) acting in the loading shaft by means of a torque measuring device on the loading shaft.

3. The method according to claim 1, wherein the at least two rotating masses, which are connected in a rotationally fixed manner are formed by a dual-mass flywheel and/or in that the at least two rotating masses, which are connected in a rotationally fixed manner, are connected by a connecting shaft, a belt or a chain.

4. The method according to claim 1, further comprising:
determining the target loading machine speed (NB_soll) by adding the corrected internal effective test object torque (MP_int_korr) and the specified target test object torque (MW_soll), with the correct sign, to form a first differential torque (MP_Diff) and multiplying the first differential torque (MP_Diff) by the reciprocal of a sum of the mass moments of inertia (J1, J2) or simulated mass moments of inertia (J1_sim, J2_sim) of the at least two rotating masses and integrate over time.

5. The method according to claim 1, further comprising:
determining the target loading machine speed (NB_soll) by adding the specified target test object torque (MW_soll), a simulated connecting element torque (MVW_sim) of a virtual connecting element that represents the rotationally fixed connection of the at least two rotating masses and an estimated internal torque ( ) of the second rotating mass of the at least two rotating masses connected to the loading shaft (6), with the correct sign, to form a third differential torque (M"P_Diff) and multiplying the third differential torque (M"P_Diff) by the reciprocal of the mass moment of inertia (J2) or a simulated mass moment of inertia (J2_sim) of the second rotating mass connected to the loading shaft and integrate over time, the at least one simulated connecting element torque (MVW_sim) being determined from the mass moment of inertia (J1) or a simulated mass moment of inertia (J1_sim) of the first rotating mass of the at least two rotating masses, from the fed-back target loading machine speed (NB_soll), from mechanical properties of the virtual connecting element and from an estimated internal torque of the first rotating mass which is formed from a sum, with the correct sign, of the corrected internal effective test object torque (MP_int_korr) and an estimated internal torque ( ) of the second rotating mass connected to the loading shaft.

6. The method according to claim 1, that further comprising:
determining the target loading machine speed (NB_soll) by adding the specified target test object torque (MW_soll), at least one simulated connecting element torque (MVW_sim) of a virtual connecting element that represents the rotationally fixed connection of the at least two rotating masses and an oscillating estimated internal torque ( ) of a second rotating mass of the at least two rotating masses connected to the loading shaft (6), with the correct sign, to form a fourth differential torque (M'''P_Diff) and multiplying the fourth differential torque (M'''P_Diff) by the reciprocal of the mass moment of inertia (J2) or a simulated mass moment of inertia (J2_sim) of the second rotating mass connected to the loading shaft and integrate over time, the at least one simulated connecting element torque (MVW_sim) being determined from the mass moment of inertia (J1) or a simulated mass moment of inertia (J1_sim) of a first mass of the at least two rotating masses, from the fed-back target loading machine speed (NB_soll), from mechanical properties of the virtual connecting element and from an estimated average internal torque of the first rotating mass which is formed by a filtered sum, with the correct sign, of the corrected internal effective test object torque (MP_int_korr) and the estimated internal torque ( ) of the second rotating mass connected to the loading shaft, the oscillating estimated internal torque ( ) of the second rotating mass connected to the loading shaft being formed from a sum, with the correct sign, of the corrected internal effective test object torque (MP_int_korr) and the estimated average internal torque of the first rotating mass.

7. The method according to claim 1, wherein at least one of the at least two rotating masses is a torque generator controlled by means of a test object control unit.

8. The method according to claim 7, wherein the torque generator is an internal combustion engine controlled by an internal combustion engine control unit, or an electric motor controlled by an electric motor control unit.

9. The method according to claim 1, further comprising:
determining the acceleration torque (MB1, MB2) of at least one rotating mass of the at least two rotating masses from a speed (N1, N2) of the relevant rotating mass and from the mass moment of inertia (J1, J2) of the relevant rotating mass.

10. The method according to claim 9, further comprising:
measuring the speed (N1, N2) of the at least one rotating mass of the at least two rotating masses for which the acceleration torque (MB1, MB2) is measured, by means of a speed measuring device on the test bench.

11. The method according to claim 10, further comprising:
filtering the measured speed (N1, N2), an angular acceleration calculated therefrom or at least one acceleration torque (MB1, MB2) by means of a filter.

12. The method according to claim 1, further comprising:
determining the target loading machine speed (NB_soll) by adding the corrected internal effective test object torque (MP_int_korr), the specified target test object torque (MW_soll) and at least one simulated connecting element torque (MVW_sim) of a virtual connecting element that represents the rotationally fixed connection of the at least two rotating masses (1, 2), with the correct sign, to form a second differential torque (M'P_Diff) and multiplying the second differential torque (M'P_Diff) by the reciprocal of the mass moment of inertia (J2) or a simulated mass moment of inertia (J2_sim) of the second rotating mass of the at least two rotating masses connected to the loading shaft and integrate over time, the at least one simulated connecting element torque (MVW_sim) being determined from the mass moment of inertia (J1) or a simulated mass moment of inertia (J1_sim) of the first rotating mass of the at least two rotating masses, from the fed-back target loading machine speed (NB_soll) and mechanical properties of the virtual connecting element.

13. The method according to claim 12, further comprising:
determining the at least one simulated connecting element torque (MVW_sim) is by multiplying the fed-back simulated connecting element torque (MVW_sim) or a sum, with the correct sign, of the fed-back simulated connecting element torque (MVW_sim) and the estimated internal torque, or the estimated average internal torque of the first rotating mass by the reciprocal of the mass moment of inertia (J1) or a simulated mass moment of inertia (J1_sim) of the first rotating mass, integrating it over time, adding it, with the correct sign, to the fed-back target loading machine speed (NB_soll) and multiplying it by the mechanical properties of the virtual connecting element.

14. The method according to claim 12, characterized in that a spring stiffness (cVW) and a damping coefficient (dVW) are used as mechanical properties of the at least one virtual connecting element.

15. Test bench with a test object, the test bench comprising:
at least one loading machine configured to drive and/or load the test object,
the test bench configured to simulate loads acting on the test object, the test object having at least two rotating masses which each have a mass moment of inertia and are connected in a rotationally fixed manner by means of a connecting element,
a loading machine,
a loading shaft connecting the loading machine with at least one of the at least two rotating masses,
an observer configured to estimate an internal test object torque (MP_int),
a test bench computing unit configured to determine a target loading machine speed (NB_soll), and
at least one loading machine control unit configured to control a target speed (NB_soll) of the loading machine,
wherein the observer is further configured to add a shaft torque (MW) determined on the test bench and acting in the loading shaft to determined acceleration torques (MB1, MB2) for accelerating the at least two rotating masses, with the correct sign, to form a corrected internal effective test object torque (MP_int_korr), and
wherein the test bench computing unit is further configured to determine the target speed (NB_soll) of the loading machine from the corrected internal effective test object torque (MP_int_korr) or a torque derived therefrom (, , ,), a specified target test object torque (MW_soll) and from the mass moments of inertia (J1, J2) or simulated mass moments of inertia (J1_sim, J2_sim) of the at least two rotating masses.

16. The test bench according to claim 15, characterized in that the observer is configured to determine the acceleration torque (MB1, MB2) of at least one of the at least two rotating masses from a speed (N1, N2) of the relevant rotating mass and from the mass moment of inertia (J1, J2) of the relevant rotating mass.

17. The test bench according to claim 15, wherein the at least two rotating masses, which are connected in a rotationally fixed manner, are formed by a dual-mass flywheel.

18. The test bench according to claim 15, wherein the connecting element is a connecting shaft, a belt or a chain.

19. The test bench according to claim 15, further including at least one clutch between two of the at least two rotating masses for decoupling the two rotating masses.

20. The test bench according to claim 15, characterized in that the test bench computing unit is configured simulate the rotationally fixed connection of the at least two rotating masses by means of a virtual connecting element.

21. The test bench according to claim 15, further including at least one speed measuring device configured to measure a speed (N1, N2) of at least one of the at least two rotating masses.

22. The test bench according to claim 21, further including at least one filter configured to filter the measured speed (N1, N2), an angular acceleration calculated therefrom, or at least one acceleration torque.

23. The test bench according to claim 15, characterized in that at least one of the at least two rotating masses is a torque generator, and the test bench further includes a test object control unit configured to control the torque generator.

24. The test bench according to claim 23, wherein the torque generator is an internal combustion engine, the test object control unit comprising an internal combustion engine control unit configured to control the internal combustion engine, or the torque generator is an electric motor, the test object control unit comprising an electric motor control unit configured to control the electric motor.

* * * * *